A. STUCKI.
ROLLER SIDE BEARING.
APPLICATION FILED AUG. 26, 1909.

1,093,953.

Patented Apr. 21, 1914.

2 SHEETS—SHEET 1.

WITNESSES
Stephen Wach.
Jas. J. Weldon

INVENTOR
Arnold Stucki
By Fredk. W. Winter
Attorney

A. STUCKI.
ROLLER SIDE BEARING.
APPLICATION FILED AUG. 26, 1909.

1,093,953.

Patented Apr. 21, 1914.
2 SHEETS—SHEET 2.

WITNESSES
INVENTOR
Arnold Stucki
By Fredk W Winter
Attorney

UNITED STATES PATENT OFFICE.

ARNOLD STUCKI, OF PITTSBURGH, PENNSYLVANIA.

ROLLER SIDE BEARING.

1,093,953.

Specification of Letters Patent.

Patented Apr. 21, 1914.

Application filed August 26, 1909. Serial No. 514,677.

*To all whom it may concern:*

Be it known that I, ARNOLD STUCKI, a resident of Pittsburgh, in the county of Allegheny and State of Pennsylvania, have invented a new and useful Improvement in Roller Side Bearings, of which the following is a specification.

This invention relates to side bearings for railway cars.

In my Patent No. 930,901, August 10, 1909, is illustrated, described and claimed a side bearing which is absolutely frictionless, which performs all the other necessary functions of side bearings, and which is inexpensive both as to first cost and subsequent repair.

The essential features of that side bearing comprise a housing or frame adapted for connection to the upper bolster and provided with a bearing surface, and a roller in the frame arranged to roll on said bearing surface and being free to travel horizontally, the housing being arranged to move vertically relative to the roller in order that the latter may remain in contact with the lower bolster or bearing during all normal clearances between the bolsters, together with means arranged to move the roller horizontally with all the changes in the angular relation of the bolster and at a peripheral speed substantially equal to the lateral movement of the bearings contacting with said roller, such means being shown as long gear teeth on the housing arranged to engage teeth projecting from the ends of the roller.

The side bearing which is the subject of this application is of the same general type and has the same general objects as that of the patent aforesaid.

The specific object of the present invention is primarily to so construct side bearings as to effectively limit the swinging or swiveling of the truck and enable the usual safety chains to be dispensed with.

Other features are changes in construction so as to strengthen the bearing, and particularly to provide for a considerable vertical movement of the roller, with improved means for preventing the roller from dropping out of the housing when the truck is taken from underneath the car.

Figure 1:
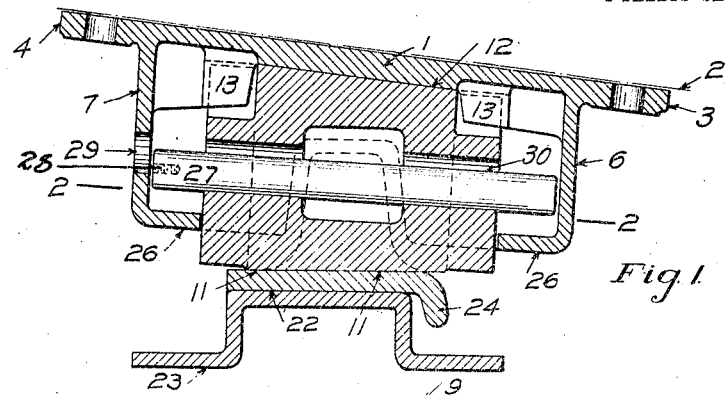
Figure 2:
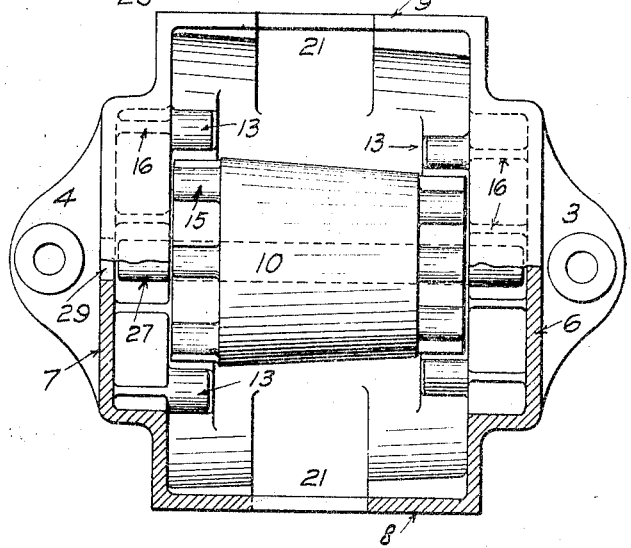
Figure 6:
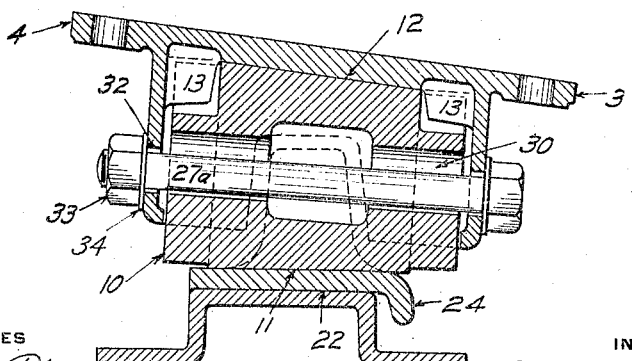
Figure 4:
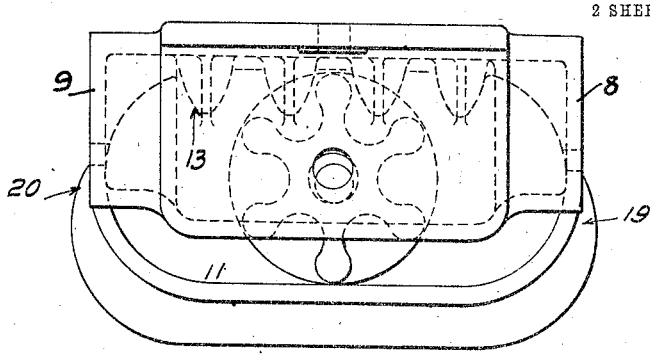
Figure 3:
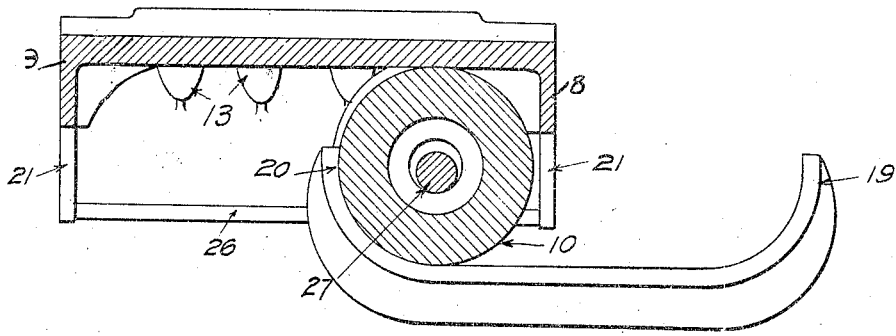
Figure 5:
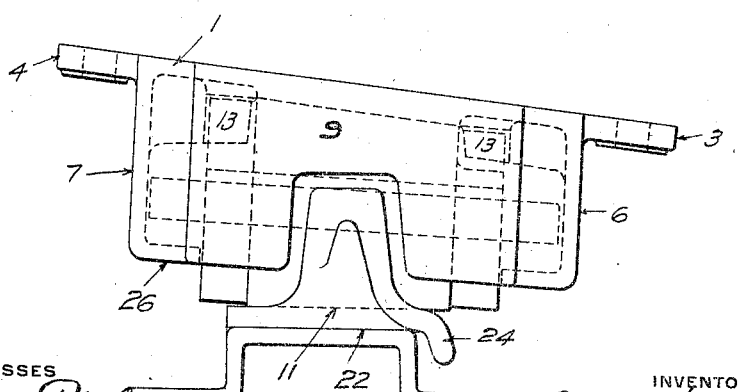

In the accompanying drawings, Figure 1 is a vertical section through the bearing taken parallel with the longitudinal axis of the bolster; Fig. 2 is in part an inverted plan view and in part a horizontal section on the line 2—2 Fig. 1; Fig. 3 is a vertical transverse section taken centrally of the bearing; Fig. 4 is a side view of the bearings; Fig. 5 is an end view thereof; and Fig. 6 is a view similar to Fig. 1 showing a modification.

In the drawings, the side bearing has been shown as adapted to be applied to a body bolster of tapering form. It can, however, be applied to a body bolster of either tapering or straight form. The side bearing comprises a suitable frame or housing 1 adapted for connection to the body bolster which is indicated generally at 2, said housing having its upper face formed on an incline to correspond to the taper of the bolster. The housing is provided with inwardly and outwardly projecting flanges 3 and 4 respectively apertured for receiving bolts or rivets for connecting the bearing to the bolster. The housing or frame is provided with a downwardly projecting inside web or wall 6, an outside web or wall 7 and with end walls 8 and 9 respectively projecting downwardly but not necessarily to the same extent as the side walls or webs. This frame or housing is open at the bottom to permit the roller 10 to project through the same and contact with the coöperating bearing 11. The top of the housing is solid and provided on its lower face with a bearing surface 12 on which the roller 10 travels.

In the preferred form the housing is provided at both the inner and outer sides with a downwardly projecting rack formed by the long teeth 13, while each end of the roller is cored out to leave the projecting teeth 15 which mesh with the teeth 13 on the housing. The teeth 13 are sufficiently long to compensate for the up and down movement of the roller and at all times remain in mesh with the teeth 15 on the roller. The intermeshing gears of the roller and rack serve not only to hold the roll in proper position and prevent it from assuming a diagonal or askew position, but also serve to move the roller with all angular movements of the bolster relation to each other, and this irrespective as to whether the body bolster is lifted off the roller or not. Obviously, as long as the body bolster is tilted so as to rest on the roller, the latter is frictionally rotated with all changes of the angular relation of the bolster, but even when the body bolster lifts off the roller the latter is still caused to travel by the intermeshing gear arrangement as long as it has frictional contact with the lower bearing, and the parts are so designed that such frictional contact exists during all normal clearances of the bolster and is disturbed only by abnormal clearances due to wrecks and the like. The inside and outside walls 6 and 7 of the housing are connected to the gear teeth by webs 16 in order to strengthen the side walls or webs 6 and 7.

The bearing so far described is in the main the same as my patent aforesaid, differing only in details, such as the shape of the side webs or walls, the webs 16 for bracing the latter, the formation of the teeth 15 in the ends of the roller, and in the presence of end walls or webs 8 and 9. In other particulars the bearing is the same. The present bearing contains important improvements over the bearing of said patent, and one of which is applicable to bearings of various types, to-wit, to limit the swiveling or swinging movement of the truck and enable the safety chains to be dispensed with. Where a truck is derailed or runs into an open switch, it is liable to swivel under the car to such a degree that it can no longer roll in the direction of movement of the car body, in which event there is danger of the forwardly moving car body tearing off the truck. To prevent excessive swiveling of trucks under car bodies safety chains connect the truck frame to the side sills of the car, which chains limit the swiveling movement of the trucks to that necessary to take the sharpest curves. The constant jangling of these chains is very objectionable. To enable safety chains to be dispensed with I provide the upper and lower bearings with coöperating stops which permit the necessary swiveling to take curves, but come into play on abnormal swiveling. Since the blow is quite severe when abnormal swiveling is interrupted, it is necessary to provide strong abutments or stops at the ends of travel. Accordingly, in a bearing of the type shown, the substantially vertical end walls 8 and 9 have been provided to take the blow of the roller 10 at the ends of its travel, and the trunnions of said roller are thereby relieved from such blows. In conjunction therewith, the lower bearing 11 is provided at its ends with upwardly projecting stop members in form of curved horns 19 and 20 respectively which project upwardly slightly above the center of the roller when the latter is in its most elevated position, the end walls 8 and 9 of the housing being cut away at 21 to provide clearance for the horns of the lower bearing. The upper ends of horns 19 and 20 are substantially vertical and hence prevent the roller being forced over the same. The lower member is shown as secured to a member 22 projecting upwardly from the lower bolster, which is indicated generally at 23, although it may be formed integral with said member 22 if desired. For the purposes of strength, the member 11 is provided with a rib or flange 24.

On a straight track the parts assume the position shown in Fig. 4 with the roller 10 central with relation to both the housing and the lower bearing 11. When the angular relation of the bolsters changes abnormally the roller 10 moves toward one end of the housing until it is stopped by the end wall 9. This change in the angular positions of the bolsters also brings the horns 20 of the lower bearing member against the roller, as shown in Fig. 3 so that said roller forms an abutment between the wall 9 and the horn 20 and prevents further angular change between the bolsters. When the bolsters swing in the opposite direction abnormally, the roller 10 comes between end wall 8 and horn 19, preventing further change in the angular relation of the bolsters in that direction. The parts are so designed that for all normal swinging of the bolsters, as when passing around curves, the roller does not contact with either of the end walls 8 or 9 nor is it contacted by the horns 19 or 20 of the lower bearing, so that the normal function of the bearing is not interfered with. Should, however, the truck leave the track or run into an open switch the abnormal change in the angular relation, i. e. the abnormal swinging of the truck under the car, is prevented in the same manner as by the safety chains which are usually provided for this purpose. This bearing enables the safety chains to be dispensed with.

The form of housing described prevents the roller from being inserted thereunto except through the bottom. To prevent the roller from dropping out when the truck is taken from under the car the side walls or webs 6 and 7 are provided with inwardly turned flanges or ledges 26 which are in the path of the ends of the axle or journal bar 27 and prevent the roller from dropping out. This journal bar is a separate piece from the roller and extends through an opening therein, which opening is sufficiently large to permit the roller to have a certain amount of vertical movement on said journal bar or axle while the latter is itself free to move vertically in the housing and permit the roller to move freely horizontally therein. One of the side walls or webs, such as the wall 7, is provided with an opening 29 through which the axle or journal bar can be inserted, but which opening is in such position that the journal bar or axle naturally drops below the level of said opening and therefore cannot accidentally escape. With the construction described the roller can move vertically a distance equal to the space between the flanges 26 and the journal bar and the difference in diameter of the opening in the roller and the journal bar itself. This gives a material amount of vertical movement to the roller without extending the side walls or webs of the housing downwardly unduly. To facilitate the removal of the journal bar or axle 27 the end thereof may be provided with a recess 28 to receive a suitable implement for lifting the same to remove it through the opening 29. If desired, the opening 30 in the roller may be so much larger than the axle or journal bar as to provide for the entire vertical movement of the roller. Fig. 6 shows a modification in which this feature is practically realized, the opening 30 in the roller being sufficiently large to provide for most of the necessary vertical movement of the roller. In this case, the axle 27ª extends through the long slots 32 in the side walls or webs of the housings and is provided on its ends with nuts or the like 33 and with washers 34 to cover the slots. The slots, in width, are slightly greater than the diameter of the axle so as to provide for a portion of the vertical movement of the roller.

The roller is entirely free to travel in the housing, its top rolling along the surface 12 in the housing and its bottom rolling on the bottom bearing 11. Consequently, the bearing is as nearly frictionless as it is possible to obtain. The roller is caused to travel with all changes in the angular relation of the bolster and hence is always in proper position to accommodate itself to the movements of the bolsters when they come together, and this entirely irrespective of their angular positions. The bearing itself is of simple construction and cannot easily break.

The bearing is shown with an incline frame or housing in order to fit the tapering form of the bolster and also to suit a conical roller, which is used to compensate for the arc shaped path of the roller. This makes the bearing frictionless. A cylindrical roller, however, might be used with fairly good results. The bearing is shown as provided with one roller, but this is not essential as the number may be increased if desired.

What I claim is:

1. A side bearing for railway cars comprising a housing for the upper bolster provided with a bearing surface and with substantially vertical downwardly projecting end portions, a freely traveling roller in said housing arranged to roll on said bearing surface between said downwardly projecting end portions, means for preventing said roller from dropping out of said housing, and a coöperating bearing for the lower bolster provided with substantially vertical end portions projecting upwardly into the path of said roller, said lower bearing being plain from side to side whereby dirt can escape therefrom, the upwardly projecting end portions of said lower bearing and the downwardly projecting end portions of the upper housing extending beyond the axis of the roller and one thereof being recessed to permit the passage therethrough of the other.

2. A side bearing for railway cars comprising a housing for the upper bolster provided with a bearing surface and with substantially vertical downwardly projecting end portions, a roller in said housing arranged to roll on said bearing surface and being free to travel horizontally therein between the end portions thereof, said housing being movable vertically relative to said roller to such an extent that the latter remains in contact with the lower bolster or bearing during normal clearances, means connecting said housing and roller and arranged to move the roller horizontally with all changes in the angular relation of the bolsters, means for preventing said roller from dropping out of said housing, and a coöperating bearing for the lower bolster provided with substantially vertical end portions projecting upwardly into the path of said roller and being plain from side to side whereby dirt can escape therefrom.

3. A side bearing for railway cars comprising a housing for the upper bolster provided with a bearing surface and with substantially vertical downwardly projecting end portions, a roller in said housing arranged to roll on said bearing surface and being free to travel horizontally therein between the end portions thereof, said housing being movable vertically relative to said roller to such an extent that the latter remains in contact with the lower bolster during normal clearances, intermeshing teeth on said housing and roller to move the roller horizontally with all changes in the angular relation of the bolsters, means arranged to prevent the roller from dropping sufficiently to disengage said intermeshing teeth, and a coöperating bearing for the lower bolster provided with substantially vertical end portions projecting upwardly into the path of the roller and being plain from side to side whereby dirt can escape therefrom.

4. A side bearing for railway cars comprising a housing for the upper bolster provided with a bearing surface and with substantially vertical downwardly projecting end portions and downwardly projecting side walls having horizontal ways, a roller in said housing arranged to travel freely horizontally therein in contact with the bearing surface and between the end portions thereof, journal members projecting beyond the ends of said roller and over the ways on the housing and serving to prevent said roller from dropping out of said housing, and a coöperating bearing for the lower bolster provided with substantially vertical end portions projecting upwardly into the path of the roller and being plain from side to side whereby dirt can escape therefrom.

5. A side bearing for railway cars comprising a housing for the upper bolster provided with a bearing surface and with substantially vertical downwardly projecting end portions and with downwardly projecting side walls having horizontal ways, a roller in said housing arranged to travel freely horizontally therein in contact with the bearing surface and between the end portions thereof, said roller being provided with a large axial opening, a journal bar extending through the axial opening of said roller and projecting over the ways on the housing and being of less diameter than said axial opening, thereby permitting said housing to have a vertical up and down movement relative to the roller but preventing the roller from dropping out of said housing, and a coöperating bearing for the lower bolster provided with substantially vertical end portions projecting upwardly into the path of said roller and being plain from side to side whereby dirt can escape therefrom.

6. A side bearing for railway cars comprising an integral frame or housing for the upper bolster provided with a bearing surface and with side walls or webs provided with horizontal ways, one of said side walls being provided with an opening therethrough above the horizontal ways, a roller in said housing arranged to travel freely horizontally therein in contact with the bearing surface, and a journal bar or axle for said roller adapted for insertion through the opening in said side wall or web and extending loosely through said roller and having its ends projecting over the ways in the frame or housing, the under surface of said journal bar or axle when in position in said roller lying below the lower edge of the opening in the side wall of the housing.

7. A side bearing for railway cars comprising a housing or frame for the upper bolster provided with a bearing surface and with side walls or webs provided with horizontal ways, a roller in said frame or housing arranged to travel on the bearing surface therein and provided with a large opening therethrough, a journal bar or axle of less size than the opening in the roller and extending therethrough and having its ends projecting over said horizontal ways, said parts being arranged to permit the roller to move vertically on said journal bar or axle, and means connecting said roller and housing and arranged to move said roller horizontally with all changes in the angular relation of the bolsters.

In testimony whereof, I have hereunto set my hand.

ARNOLD STUCKI.

Witnesses:
JAS. L. WELDON,
F. W. WINTER.